(12) United States Patent
Khanna et al.

(10) Patent No.: US 12,542,711 B2
(45) Date of Patent: Feb. 3, 2026

(54) CELL SITE DATA VALIDATION FOR ZERO-TOUCH IN O-RAN

(71) Applicant: DISH Wireless L.L.C., Littleton, CO (US)

(72) Inventors: Aseem Khanna, Parker, CO (US); Ravinder Jarral, Frisco, TX (US)

(73) Assignee: DISH Wireless L.L.C., Littleton, CO (US)

( * ) Notice: Subject to any disclaimer, the term of this patent is extended or adjusted under 35 U.S.C. 154(b) by 224 days.

(21) Appl. No.: 18/471,946

(22) Filed: Sep. 21, 2023

(65) Prior Publication Data

US 2025/0106102 A1 Mar. 27, 2025

(51) Int. Cl.
*H04W 16/18* (2009.01)
*H04L 41/08* (2022.01)
*H04L 41/0806* (2022.01)

(52) U.S. Cl.
CPC ...... *H04L 41/0809* (2013.01); *H04L 41/0886* (2013.01); *H04W 16/18* (2013.01)

(58) Field of Classification Search
CPC .............................. H04W 16/18; H04L 41/08
See application file for complete search history.

(56) References Cited

U.S. PATENT DOCUMENTS

| | | | |
|---|---|---|---|
| 6,012,152 A | 1/2000 | Douik et al. | |
| 8,411,578 B2 | 4/2013 | Taylor | |
| 11,689,949 B1* | 6/2023 | Rathor | H04L 43/067 709/224 |
| 2022/0191738 A1 | 6/2022 | Panchal | |
| 2022/0369067 A1 | 11/2022 | Chen et al. | |
| 2023/0057469 A1 | 2/2023 | Hoole et al. | |
| 2023/0083011 A1 | 3/2023 | Krishnan et al. | |
| 2023/0336411 A1* | 10/2023 | Metkar | H04L 67/10 |
| 2024/0195867 A1* | 6/2024 | Bapst | H04L 41/5009 |
| 2024/0224122 A1 | 7/2024 | Madan et al. | |
| 2024/0236691 A1 | 7/2024 | Bonati et al. | |

OTHER PUBLICATIONS

Bonati et al., "CellOS: Zero-touch Softwarized Open Cellular Networks," Computer Networks 180 (2020) 107380, www.elsevier.com/locate/comnet, 13 pages.

* cited by examiner

*Primary Examiner* — Michael T Vu
(74) *Attorney, Agent, or Firm* — Kilpatrick Townsend & Stockton LLP

(57) ABSTRACT

Various embodiments provide data validation for a cell site. In some embodiments, the data validation for the cell site is performed in different phases of the O-RAN by a validation engine. Inventory management is employed in those embodiments to capture statuses of the validation. Triggers are created to cause the validation of the cell site to move onto the next phase when one or more previous phases are completed with success statuses.

18 Claims, 7 Drawing Sheets

CELL SITE DATA VALIDATION FOR ZERO-TOUCH IN O-RAN

BACKGROUND OF THE INVENTION

Zero-touch provisioning (ZTP) is a method of setting up devices that automatically configures the device using a switch feature. ZTP helps IT teams quickly deploy network devices in a large-scale environment, eliminating most of the manual labor involved with adding them to a network.

ZTP can be found in devices and tools such as network switches, routers, wireless access points and firewalls. The goal is to enable IT personnel and network operators to install networking devices without manual intervention. Manual configuration takes time and is prone to human error—especially if many devices must be configured at scale. ZTP is faster in this case, reduces the chance of error and ensures configuration consistency.

Zero-touch provisioning is also used to automate the system updating process. Using scripts, ZTP connects configuration management platforms and other tools for configuration or updates.

An Open RAN, or Open Radio Access Network is a concept based on interoperability and standardization of RAN elements including a unified interconnection standard for white-box hardware and open source software elements from different vendors. Open RAN architecture integrates a modular base station software stack on off-the-shelf hardware which allows baseband and radio unit components from different suppliers to operate seamlessly together.

BRIEF SUMMARY OF THE INVENTION

In order to successfully implement zero or low touch provisioning to make an O-RAN functional or bring a cell site online, data facilitating zero or low touch provisioning should be readily available and accurate. Various embodiments provide data validation for a cell site. In some embodiments, the data validation for the cell site is performed in different phases of the O-RAN by a validation engine. Inventory management is employed in those embodiments to capture statuses of the validation. Triggers are created to cause the validation of the cell site to move onto the next phase when one or more previous phases are completed with success statuses.

In various embodiments, a method implemented by a computer system to facilitate validation of cell sites in different phases of open radio network access (O-RAN), is provided. In some embodiments, the method comprises: validating, during a design phase of the O-RAN, information regarding cell sites in the O-RAN, the cell sites including a first cell site; validating, during a build phase of the O-RAN, the information regarding the first cell site, the validated information for the first cell site in the build phase at least partially overlaps with the information validated in the design phase for the first cell site; validating, during an integration phase of the O-RAN, information regarding a cell site router (CSR) for the first cell site; and validating, during an operational phase of the O-RAN, information regarding at least one network function parameter of the first cell site. Other embodiments are contemplated.

DETAILED DESCRIPTION OF THE INVENTION

Figure 1:
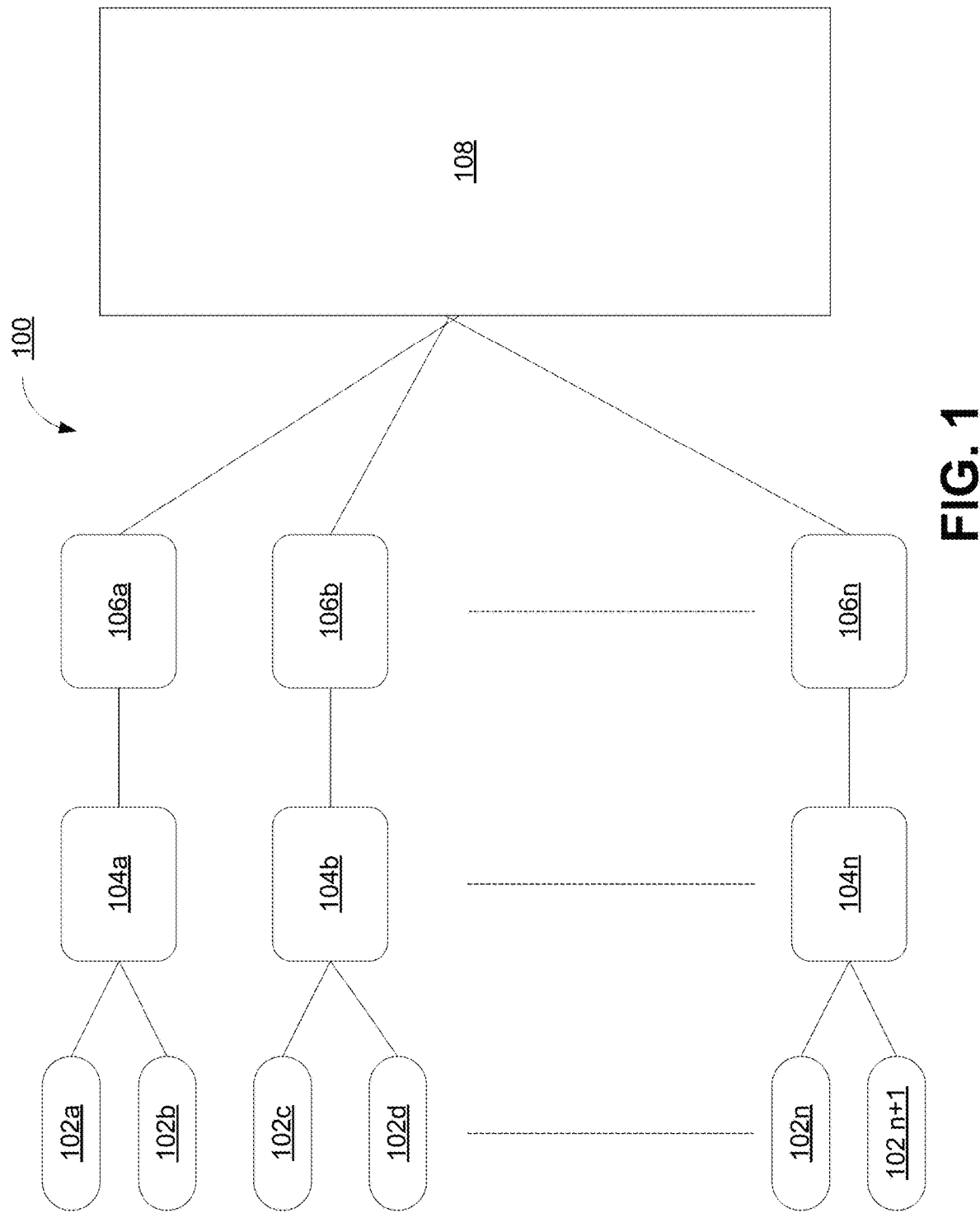
FIG. 1 illustrates an example system architecture of an O-RAN in which validation for ZTP operations are implemented in accordance with the present disclosure.

One of the key benefits of Open RAN is how it powers innovation, and automation is a driver of this innovation. Cloud-native automation tools such as Continuous Integration/Continuous Delivery (CI/CD), Zero-Touch Provisioning (ZTP), Cloud Automation, Artificial Intelligence (AI) and Machine Learning (ML) enable the creation of agile, flexible, elastic, and efficient applications in modern, dynamic Open RAN environments. When automation becomes a key feature of an ALL G Open RAN solution, Mobile Network Operators (MNOs) reap the benefits of not only flexibility of choice and cost savings, but also the agility, scalability, ease of management and upgradeability that comes with the promise of a cloud-native Open RAN solution.

It should be understood ZTP used in the present disclosure is not meant to exclude operations that would still need more or less human intervention. It is understood that not all ZTP operations necessarily are automatic. In various examples, ZTP operations may include operations that need human intervention. In those examples, such operations may be understood as low touch provisioning (LTP). As used herein, the term ZTP may include LTP.

Automated Orchestration and management is key to benefit from a cloud-native Open RAN solution. Automation with modern tools and technologies can provide several advantages and help at different stages of network deployment, from preparation to rollout of a new network or service, then operating and monitoring the network after roll-out. Automation is also important when it comes to termination or scaling down the network.

One insight provided by the present disclosure is a ZTP workflow that automatically configures an O-RAN network, e.g., a 5G O-RAN network. The ZTP workflow involves various stages setting up servers in a core network of the O-RAN and as well as devices in individual cell sites facilitating the O-RAN. In various examples, the ZTP workflow comprises computer host provisioning (CHP), v-center provisioning (VCP), node-pool creation (NPC), distribution unit instantiation (DUI), radio access network (RAN) initiation, and/or any other stages.

In various examples, a ZTP orchestrator (ZTPO) is employed to complete one or more aforementioned stages in the ZTP workflow. In those embodiments, the ZTPO kicks off the stages in a predetermined sequence. In this sequence, in an earlier stage the ZTP sets up infrastructure in the O-RAN that facilitates a later stage setup. This is akin to setting up core functions/devices in the core network, such as IP assignment capability in the core network, and then moving on to setting up individual cell sites. One advantage of this workflow lies in its scalability to incorporate a variety of vendors into the O-RAN. This workflow can be maintained by an operator/provider of the O-RAN—as opposed to having the vendors develop their own ZTP routines to bring their devices into the O-RAN.

Example O-RAN

With one or more novelties provided by the present disclosure having been generally described, an example O-RAN is provided in this section. The example O-RAN is for illustrating a context where a ZTP workflow in accordance with the present disclosure can be employed.

Open radio access network ("O-RAN" herein) is a standard that allows a telecommunications network with all its functions, except necessary hardware components facilitating radio access, to be implemented in a cloud with automated deployment and operations. FIG. 1 generally illustrates an example system architecture of an O-RAN in which validation for ZTP operations are implemented in accordance with the present disclosure. It should be understood that the example system architecture shown in FIG. 1 is not particularly limited to a type of network—such as 4G or 5G. Although, some embodiments in the present disclosure are described and illustrated in the context of 5G, the example system architecture shown in FIG. 1 is intended to show a general environment in which technologies in accordance with the present disclosure can be applied. One skilled in the art will understand how to apply the technologies in accordance with the present disclosure to a network environment described by the example system architecture shown in FIG. 1.

As shown in FIG. 1, the example system architecture 100 of an O-RAN in accordance with the present disclosure comprises multiple cell sites, such as cell sites 102*a, b, c, d, . . . , n, n*+1. As illustrated in this example, within a given cell site, such as 102*a*, one or more radio units (RU) are installed in the O-RAN in accordance with the present disclosure. A given one of the RUs in the given cell site comprises hardware components such as radio frequency (RF) transceivers, antennas configured to transmit and receive RF signals from/to end user equipment (UE), such as smartphones. In various implementations, RUs in different cell sites in the example system architecture 100 can be provided by different hardware vendors. It is contemplated that in some embodiments, the cell sites in the example system architecture 100 are heterogenous in terms of hardware they are implemented in.

Also shown in FIG. 1 are distributed units (DUs) 104*a*, 104*b* . . . and 104*n*. A given one of the DUs, such as 104*a* in this example, is configured to facilitate real-time baseband processing function. Various protocols can be configured into the given DU, such as RLC, PDCP MAC and/or any other lower-level protocols. In various implementations, the given DU is configured to communicate with at least one RU in a cell site. For example, as shown in this example, the DU 104*a* is configured to communicate with the RUs in cell sites 102*a* and 102*b*, the DU 104*b* is configured to communicate with the RUs in cell sites 102*c* and 102*d*, and DU 104*n* is configured to communicated with the RUs in cell sites in 102*n* and 102*n*+1. It should be understood that the communications illustrated between the DUs and the cell sites in FIG. 1 are merely illustrative and thus should not be understood as limiting a scope of the O-RAN in accordance with the present disclosure. That is, the O-RAN in accordance with the present disclosure is not limited to one DU connected only to two cell sites as illustrated in FIG. 1. One skilled in the art understands that the O-RAN in accordance with the present disclosure can comprise a DU configured to however many cell sites.

A given communication link between a given DU and given RU in a cell site is typically referred to as a fronthaul haul—for example, the links between cell sites 102*a/b* and DU 104*a*. In that example, the DU 104*a* is configured to consolidate and process inbound traffic from RUs in the cell sites 102*a/b*, distributes traffic to the RUs in the cell sites 102*a/b*. In implementations, the DUs can be located near the cell sites they have communication with or centralized in a local data center provided by a vendor. In some implementations, various functionalities in the DUs can be implemented using software.

Still shown in FIG. 1 are centralized units (CUs), such as CU 106*a*, 106*b*, and 106*n*. A given one of the CUs is configured to handle higher layers of communication protocols as compared to a DU. For example, less time-sensitive packet processing, such as SDAP, RRC or PDCP, may be implemented in the given CU. It should be understood that functionality split between CU and DU is not intended to be specifically limited in the present disclosure. It is understood that such a split can be a design choice for a particular O-RAN. That is, the present disclosure should not be understood as being limited to a specific version or specific versions of O-RAN, where splits between CU and DU are specifically defined. For example, the DU can be co-located with the CU, or the DU can be bundled with the RU. The DU can also run standalone. Collectively, RUs, DUs, and a CU can create a gNodeB, which serves as a radio access network (RAN) of example system architecture 100.

In implementations, CUs in an O-RAN in accordance with the present disclosure can be implemented using software. In some embodiments, the given CU may be located in a data center provided by a third party vendor. In some embodiments, one or more of the given CU can be located in the data center. The individual links between a CU and DU is typically referred to as a midhual link, for example the link between 104*a* and 106*a* shown in this example.

FIG. 1 also shows a core network 108. The core network 108 is configured to enable end users to access services such as phone calls, internet, etc. In various embodiments, the core network 108 is configured to handle operations such as subscriber location, profile, authentication, and/or any other operations. In those embodiments, such operations can facilitate the end users to employ communication technologies (such as 5G) through the example system architecture 100. In some embodiments, the services and/or operations provided by the core network 108 are implemented using software. Although only one core network 108 is shown in FIG. 1, this is not intended to be limiting. It should be understood the example system architecture 100 is not intended to be limited to 5G. It is understood embodiments provided herein can be applied to other types of cell sites when appropriate, such as LTE, 3G, 6G, WIFI or any other types of networks.

In various other examples, more than one core network 108 can be included in the O-RAN in accordance with the present disclosure. Links between a CU and the core network 108 are typically referred to as backhaul links, for example, the link between CU 106*a* and core network 108 shown in this example. The fronthaul links, midhaul links, and backhaul links shown in FIG. 1 may be collectively referred to as a transport layer for the example system architecture 100. In various embodiments, the transport layer is configured to handle end-to-end communication over the O-RAN in accordance with the present disclosure.

Figure 2:
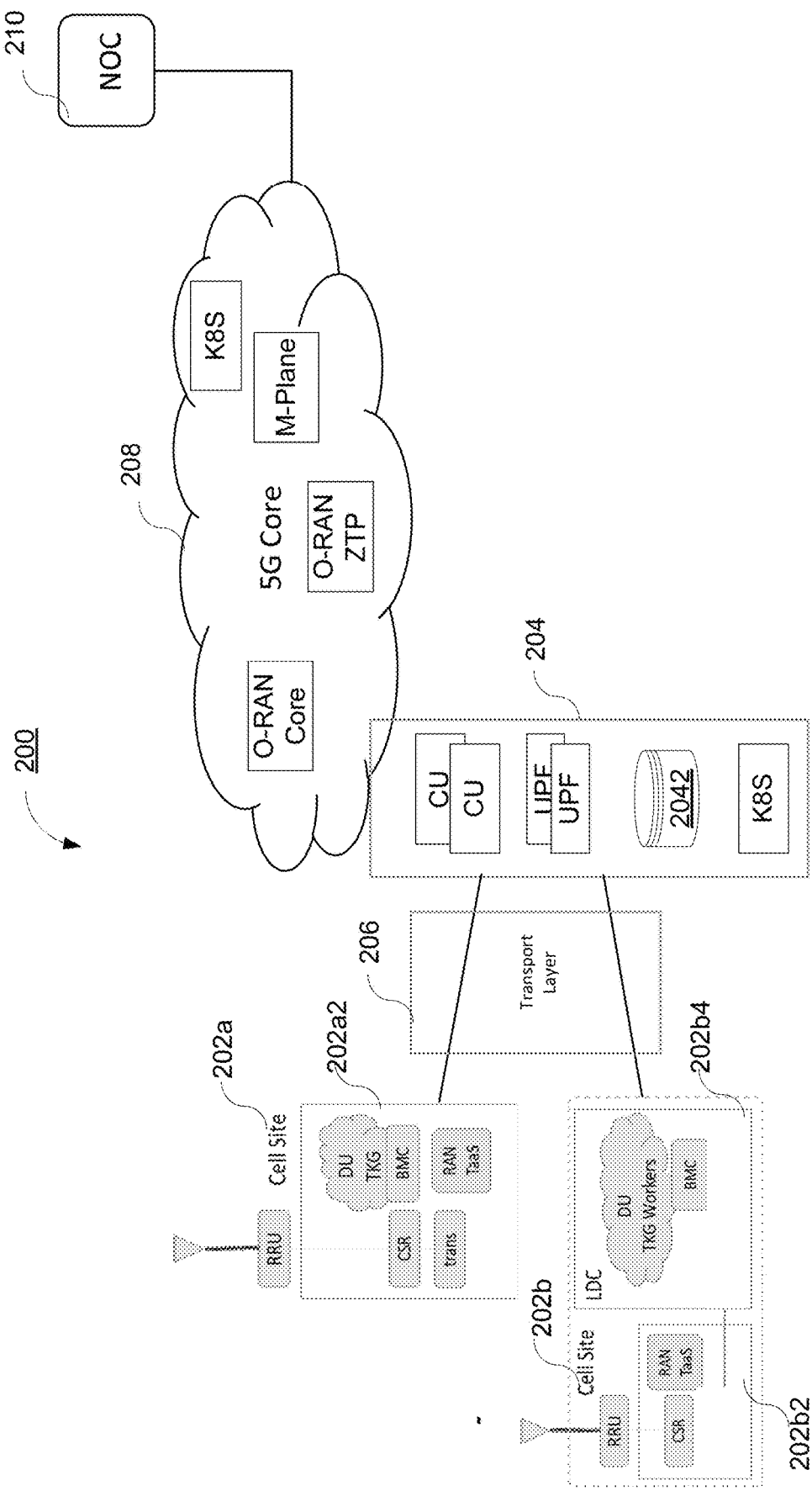
FIG. 2 illustrates an example system architecture of a 5G O-RAN implement in a cloud.

With an example system architecture 100 of O-RAN in accordance with the present disclosure having been generally described and illustrated, attention is now directed to FIG. 2, where an example system architecture 200 of a 5G O-RAN implement in a cloud is generally illustrated.

Example System Architecture of 5G O-Ran

As shown FIG. 2, the example system architecture 200 of a 5G O-RAN comprises a cell site 202*a*, a cell site 202*b*, and/or any other cell site(s). As shown, each of the cell site 202*a*, and 202*b*, in this example, includes a remote radio unit (RRU). In this example, one or more computing devices, located outside the cell site 202*a*, are configured to implement a cell site router (CSR), a DU, a baseband management controller (BMC), a RAN TaaS (test as a service), and/or any other components. In some embodiments, the computing device includes a processor configured to implement various components mentioned above. In one embodiment, the computing device(s) 202*a*2 includes an operating system such as a Linux system to implement these components. In that embodiment, the computing device(s) 202*a*2 is located in a cabinet within a proximity of the cell site 202*a*. In that embodiment, the cell site 202*a* is referred to as a "lite site".

The cell site 202*b* includes a computing device 202*b*2 and another computing device 202*b*4. In this example, the computing devices 202*b*2 and 202*b*4 are located within the cell site 202*b*. In one embodiment, the computing devices 202*b*2 and 202*b*4 are located in a cabinet within the cell site 202*b*. In that embodiment, the cell site 202*b* is referred to as a "dark site".

As shown, in this example, the computing device 202*b*2 is configured to implement the CSR, RAN TaaS, and/or any other components, while the computing device 202*b*4 is configured to implement the DU (for example, hosting Tanzu Kubernetes Grid (TKG)), BMC, and/or any other components. This is to show cell sites in a 5G O-RAN in accordance with the present disclosure can have computing devices located within the cell sites and configured to implement various components whose functionalities attributed to the DU, CSR or RAN TaaS. That is, the 5G O-RAN in accordance with the present disclosure is not intended to be limited such that DU and CSR/RAN TaaS are implemented on different computing devices, and/or outside the cell site. In some embodiments, the RAN TaaS for a specific cell site such as 202*a* or 202*b* can include tests designed to components and functionalities within the specific cell site, functionalities with another cell site (e.g., adjacency testing), and/or end-to tend testing.

In various embodiments, the RAN TaaS shown in this example is implemented using software and is configured to test and ensure one or more O-RAN components—e.g., the RRU or CSR, in the cell sites are performing in compliance with O-RAN standards. Various tests or test suites can be configured into RAN TaaS to cause target components in the cell sites to be run under preset test conditions. A goal of such a test or test suite in the RAN TaaS is to verify that individual components in the cell sites can handle expected traffic and functionality. In some embodiments, tests in the RAN TaaS are run continuously on a preset or configured frequency to ensure the above-mentioned types of testing of the specific cell sites are in compliance with the O-RAN standards continuously.

As shown FIG. 2, the cell sites 202*a* and 202*b* are connected, via the transport layer 206, to a data center 204 configured to host one or more CUs, and one or more UPFs (user plane functions) implementing at least one user plane layer, and/or any other components. In one embodiment, the data center 204 is referred to as a breakout edge data center (BEDC). In general, the data center 204 is configured to accommodate the distributed nature of various functions in the example system architecture 200 of a 5G O-RAN. In that embodiment, the BEDC hosts various 5G network functions (NFs) that have low latency requirement. In that embodiment, the BEDC provides internet peering for general 5G service and enterprise customer-specific private network service.

Shown in this example is a storage 2042 configured to store various (Cloud-native Network Functions) CNFs and artifacts for facilitating implementations of the DUs and CUs in the example system architecture 200 of the 5G O-RAN. Examples of the storage 2042 can include Amazon S3, GitHub, Harbor and/or any other storage services.

In some embodiments, such as shown in FIG. 2, the data center 204 can include one or more Kubernetes (also known as K8 S) configured to facilitate automation of deployment, scaling, and management of various software/applications deployed within the data center 204 and/or within one or more cell sites operatively communicating with the data center 204 through the transport layer 206.

5G Core 208 can be implemented such that it is physically distributed across data centers or located at a central national data center (NDC) and/or regional data center (RDC). In this example, 5G core 208 performs various core functions of the 5G network. In implementations, 5G core 208 can include an O-RAN core implementing various 5G services and/or functions such as: network resource management components; policy management components; subscriber management components; packet control components; and/or any other 5G functions or services. Individual components may communicate on a bus, thus allowing various components of 5G core 208 to communicate with each other directly. Implementations 5G core 208 can involve additional other components.

Network resource management components can include: Network Repository Function (NRF) and Network Slice Selection Function (NSSF). NRF can allow 5G network functions (NFs) to register and discover each other via a standards-based application programming interface (API). NSSF can be used by AMF to assist with the selection of a network slice that will serve a particular UE.

Policy management components can include: Charging Function (CHF) and Policy Control Function (PCF). CHF allows charging services to be offered to authorized network functions. A converged online and offline charging can be supported. PCF allows for policy control functions and the related 5G signaling interfaces to be supported.

Subscriber management components can include: Unified Data Management (UDM) and Authentication Server Function (AUSF). UDM can allow for generation of authentication vectors, user identification handling, NF registration management, and retrieval of UE individual subscription data for slice selection. AUSF performs authentication with UE.

Packet control components can include: Access and Mobility Management Function (AMF) and Session Management Function (SMF). AMF can receive connection and session related information from UE and is responsible for handling connection and mobility management tasks. SMF is responsible for interacting with the decoupled data plane, creating updating and removing Protocol Data Unit (PDU) sessions, and managing session context with the User Plane Function (UPF).

In one O-RAN implementation, DUs, CUs, 5G core 208 and/or any other components in that O-RAN, is implemented virtually as software being executed by general-purpose computing equipment, such as those in one or more data centers. Therefore, depending on needs, the functionality of a DU, CU, and/or 5G 208 core may be implemented locally to each other and/or specific functions of any given component can be performed by physically separated server systems (e.g., at different server farms). For example, some functions of a CU may be located at a same server facility as where the DU is executed, while other functions are executed at a separate server system. In some embodiments, DUs may be partially or fully added to cloud-based cellular network components. Such cloud-based cellular network components may be executed as specialized software executed by underlying general-purpose computer servers. Cloud-based cellular network components may be executed on a third-party cloud-based computing platform. For instance, a separate entity that provides a cloud-based computing platform may have the ability to devote additional hardware resources to cloud-based cellular network components or implement additional instances of such components when requested.

In implementations, Kubernetes (K8S), or some other container orchestration platform, can be used to create and destroy the logical DU, CU, 5G core units and subunits as needed for the O-RAN to function properly. Kubernetes allows for container deployment, scaling, and management. As an example, if cellular traffic increases substantially in a region, an additional logical DU or components of a DU may be deployed in a data center near where the traffic is occurring without any new hardware being deployed. (Rather, processing and storage capabilities of the data center would be devoted to the needed functions.) When the need for the logical DU or subcomponents of the DU is no longer needed, Kubernetes can allow for removal of the logical DU. Kubernetes can also be used to control the flow of data (e.g., messages) and inject a flow of data to various components. This arrangement can allow for the modification of nominal behavior of various layers.

In implementations, the deployment, scaling, and management of such virtualized components can be managed by an orchestrator (such as Kubernetes) in the 5G core 208. The orchestrator can trigger various software processes executed by underlying computer hardware. In implementations, the one or more management functions (managing the 5G core 208, and/or the example system architecture 200 in general) can be implemented in the 5G core 208, for example through a M-Plane. The M-Plane can be configured to facilitate monitoring of O-RAN and determining the amount and location at which cellular network functions should be deployed to meet or attempt to meet service level agreements (SLAs) across slices of the cellular network.

In various implementations, the orchestrator can allow for the instantiation of new cloud-based components of the example system architecture 200 of the 5G O-RAN. As an example, to instantiate a new DU, the orchestrator can perform a pipeline of calling the DU code from a software repository incorporated as part of, or separate from, cellular network 120; pulling corresponding configuration files (e.g., helm charts); creating Kubernetes nodes/pods; loading DU containers; configuring the DU; and activating other support functions (e.g., Prometheus, instances/connections to test tools).

In some implementations, a network slice functions as a virtual network operating on example system architecture 200 of the 5G O-RAN. In those implementations, example system architecture 200 of the 5G O-RAN is shared with some number of other network slices, such as hundreds or thousands of network slices. Communication bandwidth and computing resources of the underlying physical network can be reserved for individual network slices, thus allowing the individual network slices to reliably meet particular SLA levels and parameters. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). However, resources are not infinite, so allocation of an excess of resources to a particular UE group and/or application may be desired to be avoided. Further, a cost may be attached to cellular slices: the greater the amount of resources dedicated, the greater the cost to the user; thus optimization between performance and cost is desirable.

Particular network slices may only be reserved in particular geographic regions. For instance, a first set of network slices may be present at a given RU and a given DU, a second set of network slices, which may only partially overlap or may be wholly different than the first set, may be reserved at the given RU and the given DU.

Further, particular cellular network slices may include some number of defined layers. Each layer within a network slice may be used to define QoS parameters and other network configurations for particular types of data. For instance, high-priority data sent by a UE may be mapped to a layer having relatively higher QoS parameters and network configurations than lower-priority data sent by the UE that is mapped to a second layer having relatively less stringent QoS parameters and different network configurations.

In some embodiments, the 5G core 208 implements a O-RAN ZTP (zero touch provisioning) layer. In general, in those embodiments, the O-RAN ZTP layer is configured to facilitate automation of the deployment workflow within the example system architecture 200 of the 5G O-RAN. ZTP is commonly known as automated deployment of software (new or updates) to various components in a system with as little human intervention as possible. In the context of example system architecture 200 of the 5G O-RAN, ZTP means automated deployment of software (new or updates) to hardware and/or software components such as RUs, CSRs, DUs, CUs, and various modules in the 5G core 208 with little human intervention. For example without an engineer having to be present at a specific cell site such as 202*a* or 202*b*, O-RAN ZTP can facilitate automatic update of a DU with the latest DU software. It should be understood the O-RAN ZTP layer is referred to a set of components that work together to facilitate automatic deployment of software in the example system architecture 200 of the 5G O-RAN with little human intervention. Thus, although, the O-RAN ZTP layer is shown being implemented in the 5G core 208 in FIG. 2, it is merely illustrative. That is, the O-RAN ZTP in accordance with the present disclosure is not intended to be limited to components implemented a core of the O-RAN in accordance with the present disclosure. In some other examples, one or more components of the O-RAN ZTP can be implemented in, for example, CUs or DUs in the O-RAN in accordance with the present disclosure. For instance, as will be described below, adaptors configured to communicate with devices or components of different vendors for ZTP operations can be implemented in CUs or DUs.

Also shown in FIG. 2 is a NOC 210 (Network Operation Center). In some embodiments, the NOC 210 is implemented on a general-purpose computing device. In those embodiments, one or more interfaces are implemented in the NOC 210. In those embodiments, the interfaces represent virtual dashboards that can facilitate automatic deployment of software to various components in the example system architecture 200 of the 5G O-RAN. For instance, an interface is provided in the NOC 210 to enable an operator to set a schedule to update one or more network services in the 5G core 208. As another illustration, an interface is provided in the NOC 210 to enable the operator to push software to a specific component in a cell site (such as 202a or 202b) or in a data center (such as 204) to configure or update the component. One or more requests can be generated by the NOC 210 to instigate the deployment of the software as scheduled or intended by the operator. The request(s) can be received by the O-RAN ZTP layer, which in turn can generate one or more commands to deploy the software to the component. Although one NOC 210 is shown in this example, this is not intended to be limiting. More than one NOCs are typically deployed in the example system architecture 200 of the 5G O-RAN. In some implementations, a given NOC may be provided by a vendor to the 5G O-RAN. For instance, the vendor may be a software develop that provides components or services to the example system architecture 200 of a 5G O-RAN. In that instance, the given NOC is a computing device or system on a premise of the software developer.

Components such as DUs, CUs, the orchestrator, O-RAN ZTP layer, interfaces in the NOC 210, and/or any other components in the 5G core 208 may include various software components communicating with each other, handling large volumes of data traffic, and be able to properly respond to changes in the network. In order to ensure not only the functionality and interoperability of such components, but also the ability to respond to changing network conditions and the ability to meet or perform above vendor specifications, significant testing must be performed.

Example ZTP Workflow System

Figure 3:
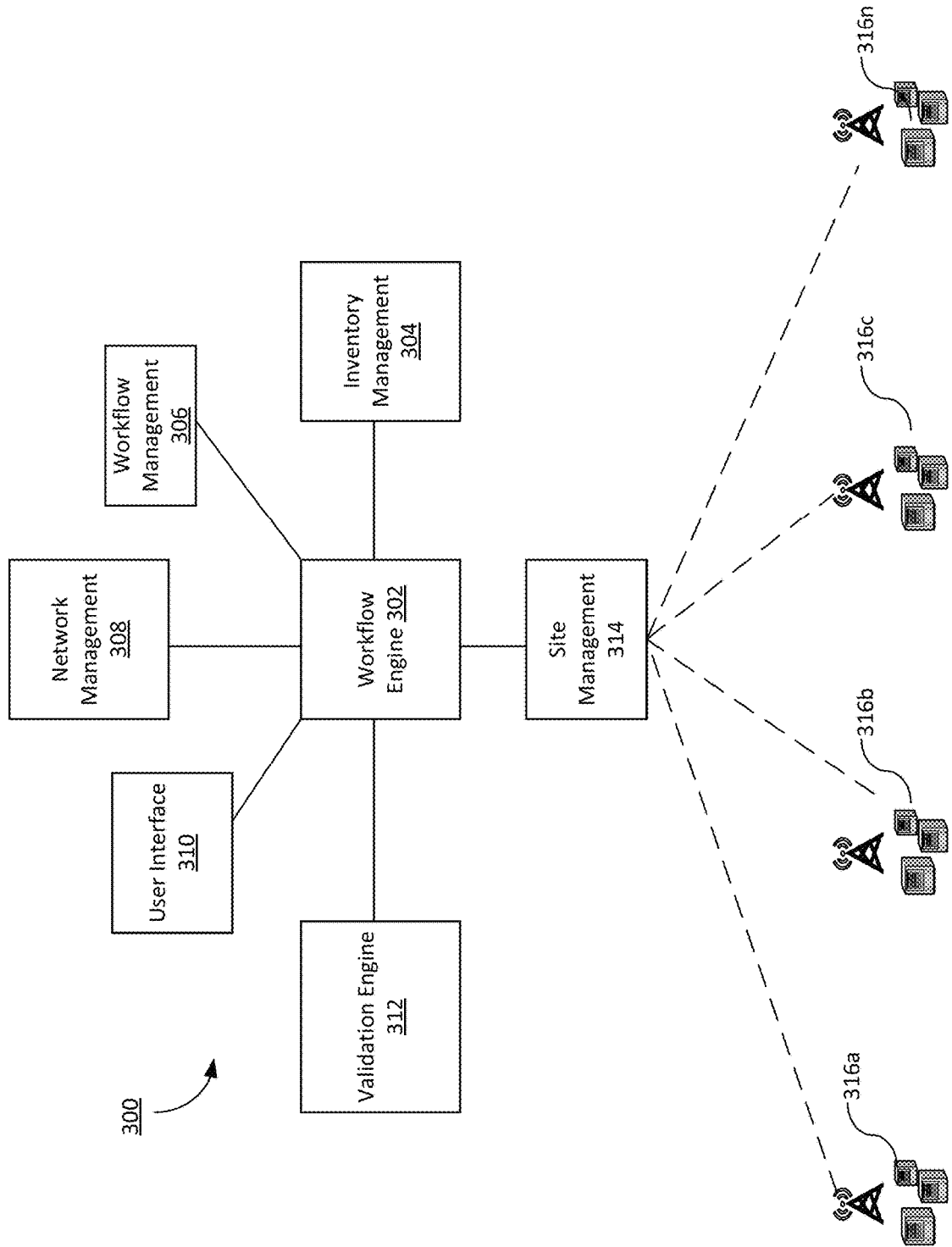
FIG. 3 illustrates an example system 300 that can facilitate for ZTP operations within a telecommunication network.

FIG. 3 illustrates an example system 300 that can facilitate for ZTP operations within a telecommunication network, such as the one shown in FIG. 1 or FIG. 2, in accordance with some embodiments. In this example, the system 300 includes a site management component 314, an inventory management component 304, a workflow engine 302, a workflow management component 306, a network management component 308, a user interface 310, a validation engine 312, and/or any other components. As also shown, the various components in the example system 300 are operable to communicate with individual cell sites 316a, 316b, 316c, 316n.

In various embodiments, the site management component 314 is configured to manage hardware and/or software deployed at each individual cell site, for example 316a, 316b, 316c, 316n. In some embodiments, the site management component 314 is configured to configure hardware on individual cell sites according to instructions provided to the site management component 314. In some embodiments, the site management component 314 is configured to boot strap network devices, upgrade network operating system (NOS), and configure VLANS across the individual cell sites. In some embodiments, the site management component 314 is configured to connect servers or hosts via selected network topology across the individual cell sites. In some embodiments, the site management component 314 is configured to deploy virtual infrastructure management (VIM) into a workload-ready state. In some embodiments, the site management component 314 comprises a bare metal orchestrator (BMO) provided by Dell.

In various embodiments, the site management component 314 is configured to manage and/or distribute workloads and/or data to individual cell sites. In some embodiments, the site management component 314 is configured to onboard, view, and manage a virtual infrastructure across the individual cell sites. In some embodiments, the site management component 314 comprises Telco Cloud Automation (TCA) orchestrator provided by VMWare.

In various embodiments, the inventory management component 304 is configured to facilitate dynamic network inventory for one or more networks provided by the individual cell sites. In some embodiments, the inventory management component 304 provides a comprehensive, end-to-end view of the resources to plan the deployment of new infrastructure for the individual cell sites and as well as to manage capacity. This facilitates delivering dynamic services like 5G, including network slicing. In some embodiments, the inventory management component 304 is configured to provide a unified, dynamic view of hybrid resources and services across multiple domains to streamline operations and reduce complexity. In those embodiments, the inventory management component 304 provides auto-discovery and federation capabilities using graph database technology to model and visualize complex, dynamic networks, enabling automated workflows, such as the ZTPO workflows. In some embodiments, the inventory management component 304 comprises a Blue Planet Inventory (BPI) system provided by Blueplanet.

In various embodiments, the workflow engine 302 is configured to facilitate ZTP operations to be carried out across the cell sites and/or on a core network. The workflow may involve automating one or more jobs to set up and/or verify one or more components on the core network to be ready for deploying network functionalities on the core network. The workflow may involve setting up one or more servers on the core network and/or in the individual cell sites for cell site deployment. The workflow may involve pushing software to update one or more components in the cell sites, and/or any other operations. In various embodiments, the workflow engine 302 comprises a Cisco Business Process Automation Service (BPA).

In various embodiments, the workflow management component 306 is configured to manage one or more workflow to be carried out by the workflow engine 302. The workflow management by the workflow management component 306 may involve managing a work flow for configuring one or more servers on the core network, one or more distributed units (DU) in the core network, one or more radio access network (RAN) in the individual cell sites, one or more virtual clusters in the core network, one or more network functions in the core network, and/or any other work flows.

In various embodiments, the network management component 306 is configured to manage one or more network components and/or devices on a core network. The network management may involve managing and identifying devices connected to the core network—for example, for the Domain Name System (DNS), Dynamic Host Configuration Protocol (DHCP), IP address management (collectively, "DDI"), and/or any other services. The network management may involve reserving and/or assigning one or more internet/intranet addresses for one or more components in the core network and/or individual cell sites. In various embodiments, the network management component comprises a system provided by Infoblox.

In various embodiments, the user interface 310 is provided to facilitate a user to monitor a progress of the ZTP operations facilitated by the workflow engine 302, verify one or more results of the workflow managed by the workflow management component 306, check one or more statuses of individual cell sites, check a status of a network function on the core network, and/or any other services. In various embodiments, the user interface 310 includes a graphical user interface (GUI) depicting a success/failure of a ZTP operation or workflow carried out to an individual cell sites, and/or whether or there is an issue with the ZTP operation and/or the workflow.

The validation engine 312 is configured to perform one or more validation tasks for the ZTP operations facilitated by the workflow engine 302. The validation may involve validating whether one or more servers are ready on the core network for deploying individual cell sites, validating whether one or more DU/RAN are deployable before their deployment and/or whether they are ready after their deployment.

Example Cell Site Validation in O-RAN

Figure 4:
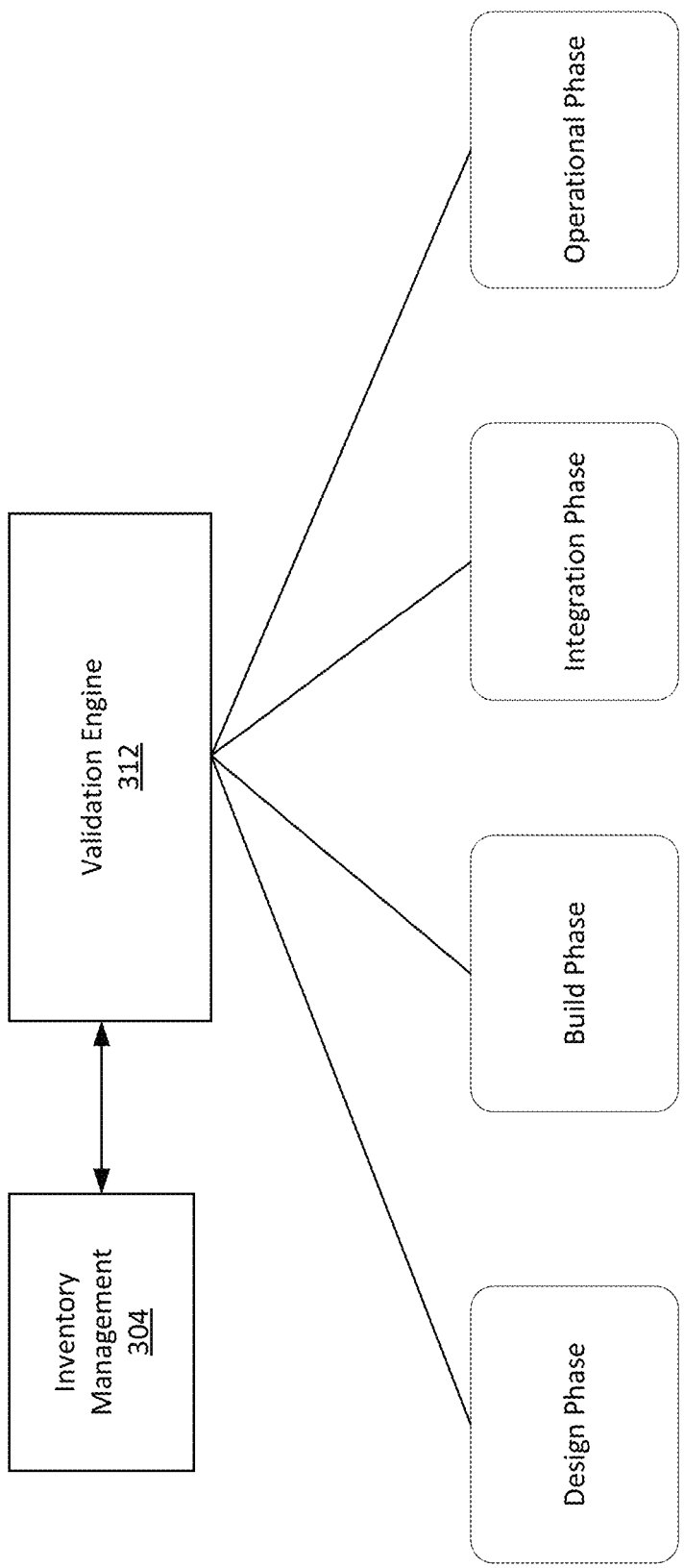
FIG. 4 illustrates an example of cell site validation by ZTPO.

With the example system 300 having been generally described, attention is now directed to FIG. 4, where an example of cell site validation by ZTPO is described. One insight provided by the present disclosure is that individual cell sites can be validated in different phases of an O-RAN as shown. For example, during a design phase of the O-RAN, parameters for individual cell sites stored in the inventory management 304 can be validated by the validation engine 312 and certified by the validation engine 302 when a success status is reached for the individual cell site. For instance, cell site parameters may be obtained from inventory management 304 for an individual cell site and verified by the workflow engine 302 during this phase. Upon a success verification of the cell site parameters, the workflow engine 302 can record a success status in the inventory management system 304 to certify that this particular cell site is ready to be deployed in the O-RAN. Below is an example list of cell site parameters that can be validated during this phase:

| Basic Validation rules | |
|---|---|
| Cell Site Parameter Name | |
| id | not null validation |
| name | 11 characters long, first 5 are Alpha, next five are numeric and last one is Alpha First 2 char represent a market, next 3 represent AOI |
| latitude | standard decimal format and needs to be positive value |
| longitude | standard decimal format and needs to be negative value |
| address | not null validation |
| cell_site_group | not null validation |
| csr_site_type | value should be either of 'Lit' or 'Dark' or 'MW-Lit' or 'MW-Dark' |
| data_center | 11 Character long, first 6 are Alpha, next 4 are numeric, last one is Alpha |
| country | not null validation |
| region | Lookup validation-table name - staging |
| state | Lookup validation -lookup table will be either in N1 src_nso_site & dm_nso_site OR staging.src_nso_site staging.dm_nso_site |
| siteID | Should be same as name plus character validation applicable for name |
| ring_ID | should be first 10 Characters of siteID. |
| data_Center_Type | |
| zip | not null validation |
| status | Should be equal to 'Primary' |
| city | not null validation |

| Basic Validation rules | |
|---|---|
| Cell Neighbor Parameters | |
| id | not null |
| name | not null |
| server_site_sector_id | not null (13 digit) |
| server_site_id | not null (11 digit) |
| server_band_sector_id | not null |
| neighbor_site_sector_id | not null (13 digit) |
| neighbor_site_id | not null (13 digit) |
| neighbor_band_sector_id | not null |
| priority | numeric (up to 2 digit) |

Once the cell site is validated, for example by checking the cell site parameters listed above in the inventory management 304, a status may be recorded for this cell site such that the cell site is certified to be built in the O-RAN. During a build phase of the cell site, field engineers and/or technicians set up the infrastructure of the cell site and various cell site parameters may be 5 validated during and/or after that phase. Below is an example list of the cell site parameters that may be validated by the validation engine 312 during or after the build phase of the cell site:

| Basic Validation rules | |
|---|---|
| Cell Site Parameters | |
| id | not null validation |
| name | first 11 digits should be that of siteID + '_' + sectoreID + '_' + Band (Not Case sensitive) |
| amf_name | not null validation |
| arfcn_dl | 6 numeric only |
| arfcnsul | upto double numeric |
| arfcnsdl | upto double numeric |
| arfcn_ul | 6 numeric only |
| band | not null |
| bandwidth_dl | not null and numeric only |
| carrier_bandwidth_ul | not null and numeric only |
| per_branch_radio_power | not null and numeric only |
| nr_local_cell_id | not null and numeric only |
| ciq_mcc | not null and numeric only |
| mimo | number + 'X' + number |
| ciq_mnc | not null and numeric only |
| nr_cell_id | numeric only {10 digit} |
| nr_cell_name | same as name and rules |
| nr_freq_band | numeric only {10 digit} |
| nr_cgi | numeric only (17 digit) |
| nsdl_bandwidth | numeric (up to 3 digit) |
| nSUL_bandwidth | numeric (up to 3 digit) |
| pa_power_dbm | decimal (up to 6 digit) |
| paging_cycle | not null |
| pci | numeric (up to 3 digit) |
| prach | numeric (up to 3 digit) |
| priority | |
| scs_mu | |
| sector_id | numeric (1 digit) |
| site_id_in_gnodeb | numeric (1 digit) |
| site_sector_id | |
| site_type Macro | |
| ssb_frequency_arfcn | numeric (6 digit) |
| sub_carrier_spacing | numeric (2 digit) |
| tac | numeric (5 digit) |
| absoluteFreqPointA | decimal (up to 6 digit) |
| fiber_type | |
| server_site_id | |
| ru_id | numeric (9 digit) same as radio_id |
| qrxlevmin | numeric (up to 3 digit) |
| qqualmin | numeric (up to 3 digit) |
| server_Sector_id | |
| server_Site_id | |
| serving_PCI | |

| Basic Validation rules | |
|---|---|
| Antenna Parameters | |
| id | not null |
| name | site id + "_" + alpha up to 5 char |
| antenna_height | decimal (up to 6 digit) |
| modelNumber | not null |
| azimuth | numeric (up to 3 digit) |
| mechanical_tilt | decimal (up to 4 digit) |
| electrical_tilt | decimal (up to 4 digit) |
| latitude | standard decimal format and needs to be positive value |
| longitude | standard decimal format and needs to be negative value |
| RU Parameters | |
| id | not null |
| name | alphanumeric (16 digit) |
| radio_id | numeric (9 digit) |
| serial | alphanumeric (up to 20 digit) |
| Cloud Zone Parameters | |
| id | not null |
| name | same as DCs:name |
| vcenter_name | not null |
| vmc_segment | not null |
| root_dc | not null |
| tca | not null |
| availability_zone | not null |
| sddc_number | not null |
| network_segment | numeric (up to 2 digit) |
| cluster_number | numeric (up to 2 digit) |
| vc_datacenter | not null |
| aws_region | not null |

After the build phase of the cell site, various attributes of the cell site, such as the ones listed above, are validated to ensure the cell site is set up correctly. If the validation is successful, another status to indicate that the cell site is certified after the build phase can be recorded in the inventory management 304. This status can indicate that the cell site is ready to be integrated into O-RAN. During the integration phase of the cell site, various components of the cell site are configured by ZTP operations to make the cell site functionable. For example, CSRs, RUs, and gNB for the cell site are set up during this phase such that the cell site becomes a part of the O-RAN to provide access. Below is a list of example cell site parameters that can be validated during this phase by the validation engine during and/or after the integration phase of the cell site:

| Basic Validation rules | |
|---|---|
| CSR Parameters | |
| id | not null |
| name | site id + "-CS000-CSR001" |
| uplink_interface | not null |
| uplink_interface_vlan1 | numeric (4 digit) |
| uplink_interface_vlan2 | numeric (4 digit) |
| gNB parameters | |
| id | not null |
| name | first 5 digits of site id, last 6 digits numeric same as gnodeb_id |
| gnodeb_id | numeric (6 digits) |
| gnodeb_length | numeric (2 digits) |

| Basic Validation rules | |
|---|---|
| IP address for the cell site | |
| id | not null |
| name | "IPAM_" + <site id> |
| bmc_mgmt | IP_v4 address |
| bvi_f1c_vlan_ipv4 | IP_v4 address |
| bvi_f1c_vlan_ipv4_mask | numeric (up to 2 digit) |
| bvi_f1c_vlan_ipv4_network | IP_v4 subnet address |
| bvi_f1c_vlan_ipv6 | IP_v6 address |
| bvi_f1c_vlan_ipv6_mask | numeric (up to 2 digit) |
| bvi_f1c_vlan_ipv6_network | IP_v6 subnet address |
| bvi_f1u_vlan_ipv4 | IP_v4 address |
| bvi_f1u_vlan_ipv4_mask | numeric (up to 2 digit) |
| bvi_f1u_vlan_ipv4_network | IP_v4 subnet address |
| bvi_f1u_vlan_ipv6 | IP_v6 address |
| bvi_f1u_vlan_ipv6_mask | numeric (up to 2 digit) |
| bvi_f1u_vlan_ipv6_network | IP_v6 subnet address |
| bvi_k8s_mgmt_vlan_ipv4 | IP_v4 address |
| bvi_k8s_mgmt_vlan_ipv4_mask | numeric (up to 2 digit) |
| bvi_k8s_mgmt_vlan_ipv4_network | IP_v4 subnet address |
| bvi_k8s_mgmt_vlan_ipv6 | IP_v6 address |
| bvi_k8s_mgmt_vlan_ipv6_mask | numeric (up to 2 digit) |
| bvi_k8s_mgmt_vlan_ipv6_network | IP_v6 subnet address |
| bvi_m_plane_vlan_ipv4 | IP_v4 address |
| bvi_m_plane_vlan_ipv4_mask | numeric (up to 2 digit) |
| bvi_m_plane_vlan_ipv4_network | IP_v4 subnet address |
| bvi_m_plane_vlan_ipv6 | IP_v6 address |
| bvi_m_plane_vlan_ipv6_mask | numeric (up to 2 digit) |
| bvi_m_plane_vlan_ipv6_network | IP_v6 subnet address |
| bvi95_ipv4 | IP_v4 address |
| bvi95_ipv4_mask | numeric (up to 2 digit) |
| bvi95_ipv4_network | IP_v4 subnet address |
| bvi95_ipv6 | IP_v6 address |
| bvi95_ipv6_mask | numeric (up to 2 digit) |
| bvi95_ipv6_network | IP_v6 subnet address |
| bvi96_ipv4 | IP_v4 address |
| bvi96_ipv4_mask | numeric (up to 2 digit) |
| bvi96_ipv4_network | IP_v4 subnet address |
| bvi96_ipv6 | IP_v6 address |
| bvi96_ipv6_mask | numeric (up to 2 digit) |
| bvi96_ipv6_network | IP_v6 subnet address |
| c_plane | IP_v4 address |
| cu_plane_vlan | numeric (up to 3 digit) |
| dhcpv4_ran_ip1 | IP_v4 address |
| dhcpv4_ran_ip2 | IP_v4 address |
| dhcpv4_sm_ip1 | IP_v4 address |
| ipam_pool | first 6 digit alpha, last 5 digit numeric |
| esxi_host_mgmt | IP_v4 address |
| f1c | IP_v4 address |
| f1u | IP_v4 address |
| f1u_vlan | numeric (up to 3 digit) |
| k8s_mgmt | IP_v4 address |
| m_plane_vlan | numeric (up to 3 digit) |
| m_plane | IP_v4 address |
| uplink1_hostname | alpha/numeric (23 digit) |
| uplink1_ipv4_mask_csr_30 | numeric (up to 2 digit) |
| uplink1_ipv6_mask_csr_126 | numeric (up to 3 digit) |
| uplink1_pe_interface | alpha/numeric (up to 30 digit) |
| uplink2_hostname | alpha/numeric (23 digit) |
| uplink2_ipv4_mask_csr_30 | numeric (up to 2 digit) |
| uplink2_ipv6_mask_csr_126 | numeric (up to 3 digit) |
| uplink2_pe_interface | alpha/numeric (up to 30 digit) |
| f1c_vlan | numeric (up to 3 digit) |
| du_mplane_netattchdef_ipamsubnet | IP_v4 subnet |
| du_mplane_netattchdef_ipamrangestart | IP_v4 address |
| du_mplane_netattchdef_ipamsrangeend | IP_v4 address |
| du_mplane_netattchdef_routes_destination | IP_v4 subnet |
| du_mplane_netattchdef_gateway | IP_v4 address |
| du_f1c_netattchdef_ipamsubnet | IP_v4 subnet |
| du_f1c_netattchdef_ipamrangestart | IP_v4 address |
| du_f1c_netattchdef_ipamsrangeend | IP_v4 address |
| du_f1c_netattchdef_routes_destination | IP_v4 subnet |
| du_f1c_netattchdef_gateway | IP_v4 address |
| du_f1u_macvlan_netattchdef_ipamsubnet | IP_v4 subnet |

-continued

|  | Basic Validation rules |
|---|---|
| du_f1u_macvlan_netattchdef_ipamrangestart | IP_v4 address |
| du_f1u_macvlan_netattchdef_ipamsrangeend | IP_v4 address |
| du_f1u_macvlan_netattchdef_routes_destination | IP_v4 subnet |
| du_f1u_macvlan_netattchdef_gateway | IP_v4 address |
| du_upNet | IP_v4 subnet |
| k8s_mgmt_vlan | numeric (up to 3 digit) |

After the cell site is integrated into the O-RAN, a set of parameters, such as the ones shown above, can be checked by the validation engine 312 to ensure that the cell site is up and running properly. A status can be recorded in the inventory management 304 to indicate that the cell site is operational in the O-RAN. Thereafter, during the operational phase of the cell site, the validation engine 312 can be configured to check one or more parameters listed above to ensure that the cell site is functioning properly continuously during this phase. In addition or alternatively, the following example list of parameters can be validated by the validation engine 312 during this phase:

|  | Basic Validation rules |
|---|---|
| Network Function Parameters | |
| name | 14 character, left 5 of site id + nfId |
| type | alpha (up to 8 digits) |
| nfId | numeric (up to 9 digits) |
| num_RU | numeric (1 digits) |
| l1interface_count | numeric (2 digits) |
| du_namespace | site Id + "-ns-" + 2 digit abbreviation of ran_vendor + "-du-" + numeric (6 digit) + "-" + numeric (3 digit) |
| ptp_namespace | site Id + "-ns-" + 2 digit abbreviation of ran_vendor + "-ptp-" + numeric (6 digit) + "-" + numeric (3 digit) |
| f1u_network | not null |
| radcup_network | not null |
| global_nf_nfId_DU | not null |
| global_nf_mtcilId | not null |
| global_mtcil_kafka_svc_fqdn | not null |
| global_mtcil_etcd_svc_fqdn | not null |
| global_nf_nfId_PTP | not null |
| mgmt_port_group | not null |
| f1c_portGroup | not null |
| mplane_portGroup | not null |
| uplane_portGroup | not null |
| k8s_mgmt_portGroup | not null |
| vmc_segment_mtcil | not null |
| sdaas_ip | ip_v4 address |
| cnf_name | site Id + "-cnf-" + 2 digit abbreviation of ran_vendor + "-du-" + numeric (6 digit) + "-" + numeric (3 digit) |
| n3_cuup_virtual | not null |
| n3_cuup_vlan | not null |
| f1u_cuup_virtual | not null |
| f1u_cuup_vlan | not null |
| xn_u_cuup_virtual | not null |
| xn_u_cuup_vlan | not null |
| e1_cuup_virtual | not null |
| e1_cuup_vlan | not null |
| amf_cuup_vlan | not null |
| upf_ip_voice | not null |
| upf_vlan | not null |
| n3_cuup | not null |
| f1u_cuup | not null |
| xn_u_cuup | not null |
| e1_cuup | not null |
| amf_ip | not null |
| upf_ip | not null |
| cuup_gateway_ip | not null |
| upf_gateway_ip | not null |
| cu_global_mtcil_topogw_fqdn | not null |
| cuup_labelKey | not null |
| cuup_labelValue | not null |
| e1_cuup_ipamrangestart | not null |
| e1_cuup_ipamrangeend | not null |
| e1_cuup_virtual_ipamrangestart | not null |
| e1_cuup_virtual_ipamrangeend | not null |
| e1_cuup_gateway | not null |
| e1_cuup_virtual_ip_subnet_mask | not null |
| f1u_cuup_dpdk_resource | not null |
| f1u_cuup_pci_address | not null |
| f1u_cuup_ipamrangestart | not null |
| f1u_cuup_ipamrangeend | not null |
| f1u_cuup_virtual_ipamrangestart | not null |
| f1u_cuup_virtual_ipamrangeend | not null |
| f1u_cuup_gateway | not null |
| f1u_cuup_virtual_ip_subnet_mask | not null |
| n3_cuup_dpdk_resource | not null |
| n3_cuup_pci_address | not null |
| n3_cuup_ipamrangestart | not null |
| n3_cuup_ipamrangeend | not null |
| n3_cuup_virtual_ipamrangestart | not null |
| n3_cuup_virtual_ipamrangeend | not null |
| n3_cuup_gateway | not null |
| n3_cuup_virtual_ip_subnet_mask | not null |
| xn_u_cuup_dpdk_resource | not null |
| xn_u_cuup_pci_address | not null |
| xn_u_cuup_ipamrangestart | not null |
| xn_u_cuup_ipamrangeend | not null |
| xn_u_cuup_virtual_ipamrangestart | not null |
| xn_u_cuup_virtual_ipamrangeend | not null |
| xn_u_cuup_gateway | not null |
| xn_u_cuup_virtual_ip_subnet_mask | not null |
| n2_cucp_virtual | not null |
| n2_cucp_vlan | not null |
| e1_cucp_virtual | not null |
| e1_cucp_vlan | not null |
| f1c_cucp_virtual | not null |
| f1c_cucp_vlan | not null |
| xn_c_cucp_virtual | not null |
| xn_c_cucp_vlan | not null |
| n2_cucp | not null |
| e1_cucp | not null |
| f1c_cucp | not null |
| xn_c_cucp | not null |
| cucp_hub | not null |
| cu_global_mtcil_kafka_svc_fqdn | not null |
| cu_global_mtcil_etcd_svc_fqdn | not null |
| cucp_labelKey | not null |
| cucp_labelValue | not null |
| n2_cucp_ipamrangestart | not null |
| n2_cucp_ipamrangeend | not null |
| n2_cucp_virtual_ipamrangestart | not null |
| n2_cucp_virtual_ipamrangeend | not null |
| n2_cucp_gateway | not null |
| n2_cucp_routes_destination | not null |
| n2_cucp_virtual_ip_subnet_mask | not null |
| e1_cucp_ipamrangestart | not null |
| e1_cucp_ipamrangeend | not null |
| e1_cucp_vitual_ipamrangestart | not null |
| e1_cucp_virtual_ipamrangeend | not null |
| e1_cucp_gateway | not null |
| e1_cucp_virtual_ip_subnet_mask | not null |
| xn_c_cucp_ipamrangestart | not null |
| xn_c_cucp_ipamrangeend | not null |
| xn_c_cucp_vitual_ipamrangestart | not null |
| xn_c_cucp_virtual_ipamrangeend | not null |
| xn_c_cucp_gateway | not null |
| xn_c_cucp_virtual_ip_subnet_mask | not null |
| f1c_cucp_ipamrangestart | not null |
| f1c_cucp_ipamrangeend | not null |

|  | Basic Validation rules |
|---|---|
| flc_cucp_virtual_ipamrangestart | not null |
| flc_cucp_virtual_ipamrangeend | not null |
| flc_cucp_gateway | not null |
| flc_cucp_virtual_ip_subnet_mask | not null |
| Network Slices | |
| id | not null |
| name | not null |
| snssai | not null |

Figure 5:
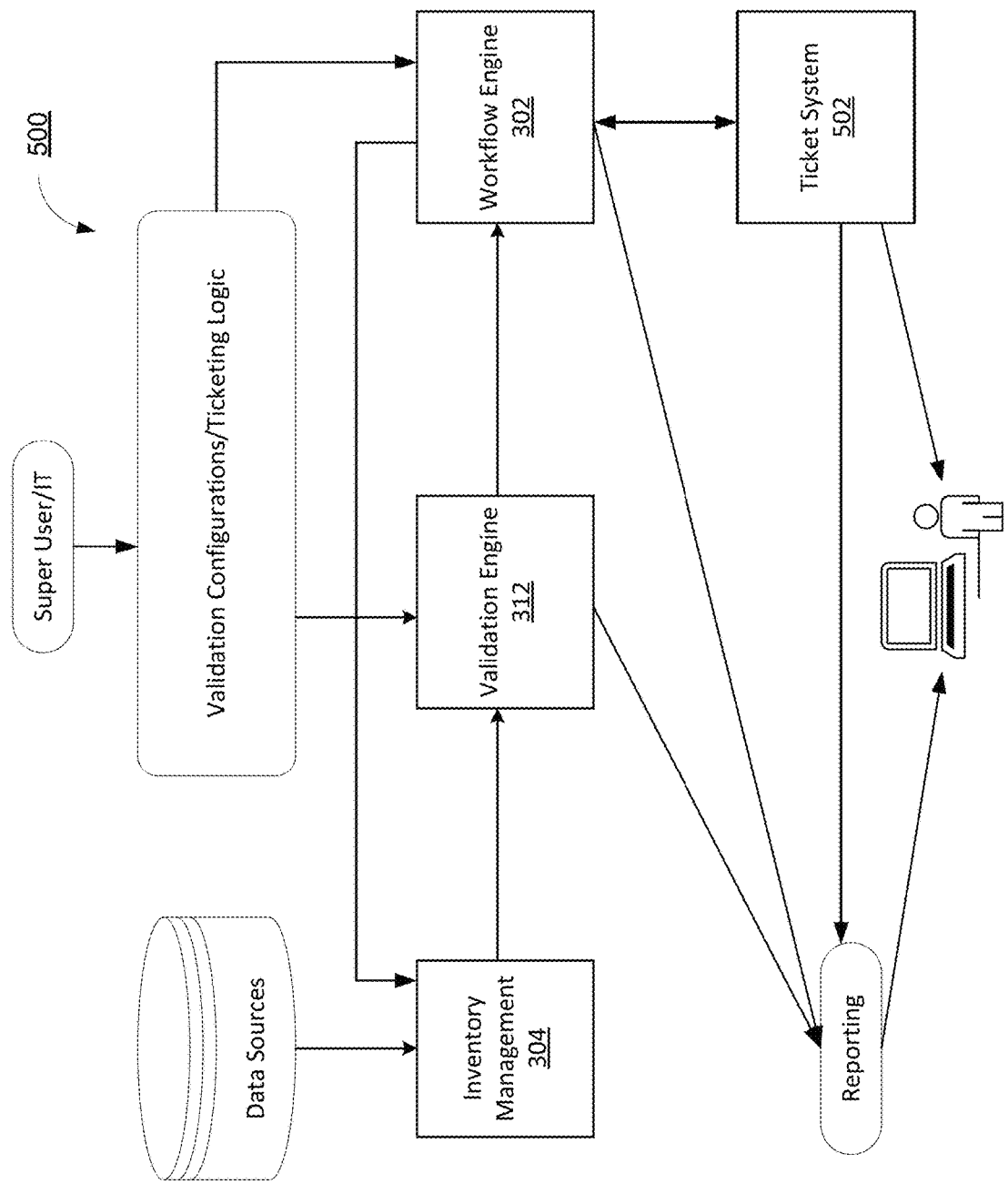
FIG. 5 illustrates one example of a system for validating various cell parameters, such as the ones listed above, in an O-RAN.

FIG. 5 illustrates one example of a system 500 for validating various cell parameters, such as the ones listed above, in an O-RAN. In various embodiments, the system 500 may be employed from time to time to certify a particular cell site is ready during different phases, such as the ones shown in FIG. 4. As can be seen, the validation engine 312 can be configured to validate data from the inventory management 304, which can be configured to store and/or manage data from different data sources as shown. Example of the data sources can include information provided by the network management 308, servers deployed in O-RAN, servers provided by a third-party provider for facilitating the O-RAN (e.g., servers to facilitate cloud for the O-RAN), databases, and/or any other data sources. During different phases of the cell site, such data sources can provide cell site parameters for the validation engine 312 to validate. For instance, during the integration phase of the cell site, the network management system 308 can provide IP address information regarding the cell site to facilitate the validation engine 312 to validate various IP parameters for the cell site, such as the ones shown above.

As also shown here, validation configurations may be stored, for example in one or more computing hosts or databases, such that the validation by the validation engine 312 can be customized and/or modified by a super user or an IT personnel of the O-RAN. The validation configurations may be provided to the validation engine 312 from time to time such that the validation of the cell site in different phases can be updated accordingly. In this example, a workflow engine 302 is employed to ensure proper steps/workflow are executed after a validation of the cell site is performed by the validation engine 312. For example, as mentioned above, one or more validation statuses may be recorded after a validation of the cell site for a particular phase. In that example, the workflow engine 302 can be configured to record an appropriate status in inventory management 304 after the validation. As another example, in a failed validation of the cell site, the workflow engine 302 can be configured to execute appropriate measures to address the validation failure.

In this example, the workflow engine 302 is configured to use ticketing logic (e.g., set by a super user and/or IT personnel of the O-RAN) to request a ticket to be instantiated by the ticketing system 502. In this example, the workflow engine 302 is also configured to request a report to be generated to show one or more parameters of the cell site are not validated successfully. Both the reporting and the ticketing system 502 can be made accessible to a responsible entity (such as a RF engineer, a network engineer, a network designer, a service provider and/or any other entities) for address the failed validation.

Figure 6:
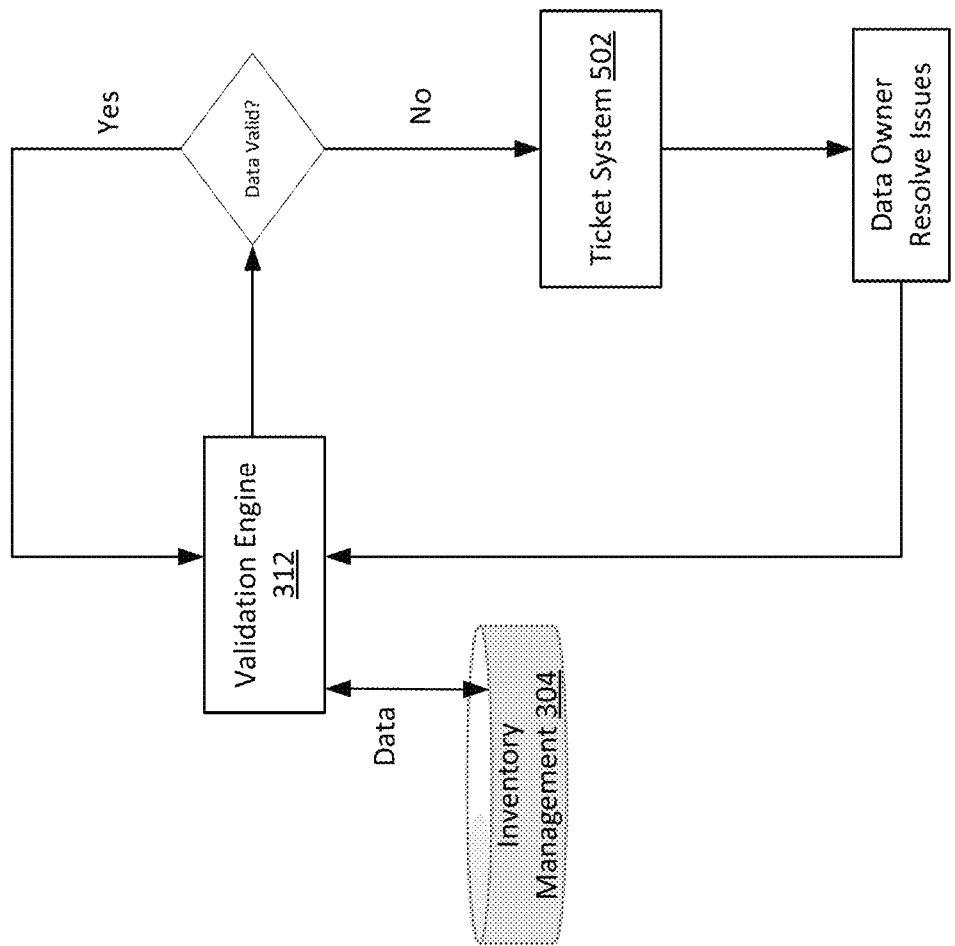
FIG. 6 illustrates an example of the data from the inventory management to be validated during different phases of a cell site in the O-RAN.

Attention is now directed to FIG. 6, where an example of the data from the inventory management can be validated during different phases of a cell site in the O-RAN. As shown, in this example, the validation engine 312 is configured to validate data from the inventory management system 304 at a particular phase of the cell site, for example a design phase of the cell site. At that point, certain cell site parameters, such as the ones shown above, should be validated. As can be seen, the validation engine 312 determines if one attribute of the data, such as the ones shown above, is valid or not. If it determines that the data attribute is valid, then the validation engine 312 moves on to the next data attribute to verify until all of the data attributes for that phase of the cell site is validated. As shown, if one data attribute is not valid in this process, the validation engine can cause (for example through the workflow engine 302) a ticketing system such as the ticketing system 502 shown in FIG. 5 to generate a ticket in the ticketing system. Once the ticket is generated, an owner of the data attribute (e.g., an RF engineer or a network engineer) is notified and given a timeframe to address the issue. At the end of that timeframe, the validation engine 312 checks again to verify if the data attribute is valid for the cell site in the particular phase.

Example Computer System

Figure 7:
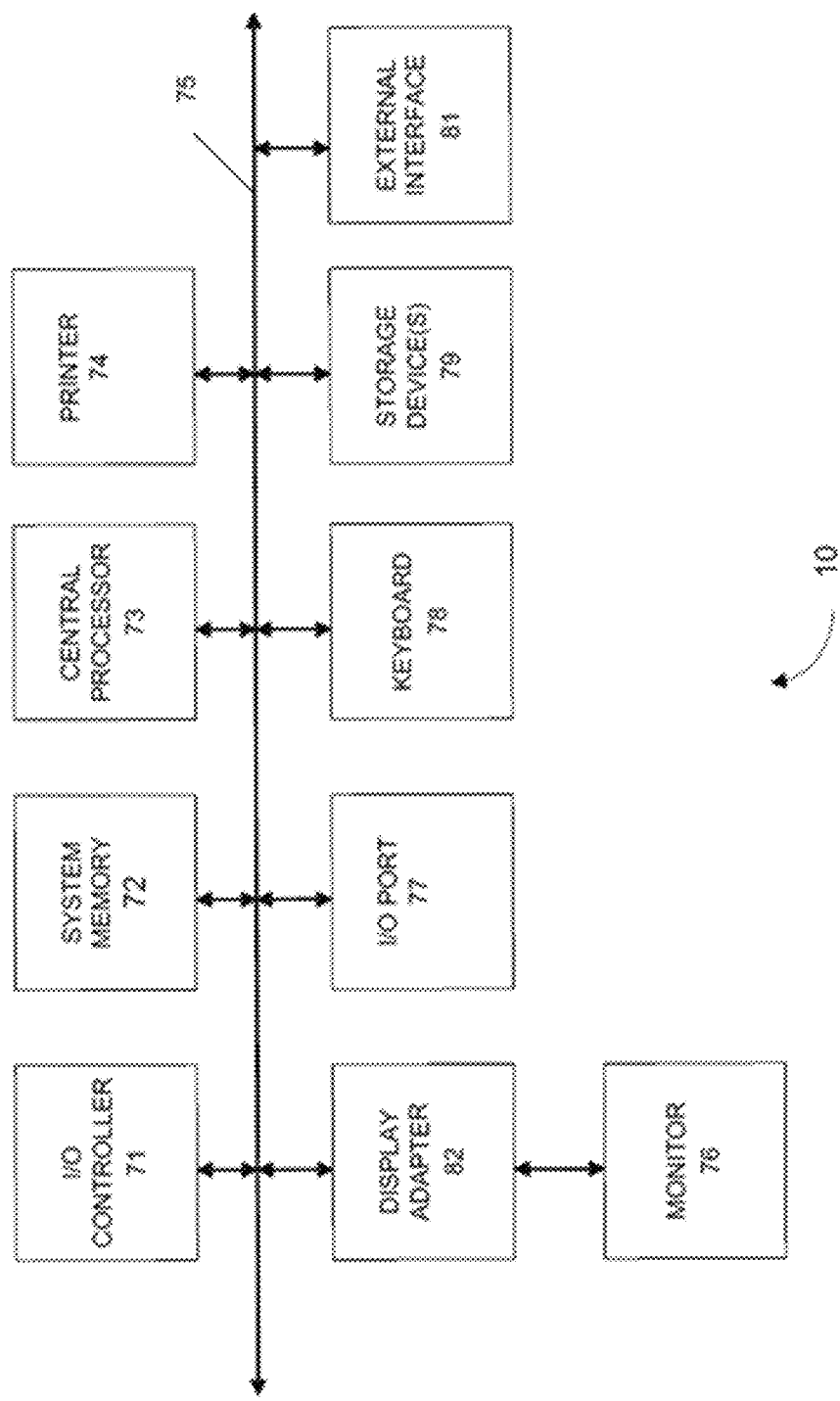
FIG. 7 generally illustrates an example of a computer system that can be used to implement various embodiments.

Any of the computer systems and embodiments mentioned herein may be implemented by or utilize any suitable number of subsystems. Examples of such subsystems are shown in FIG. 7 in computer system 10, which can be configured to implement various features and/or functions described herein. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 7 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method implemented by a computer system to facilitate validation of cell sites in different phases of open radio network access (O-RAN), wherein the method comprises:

validating, during a design phase of the O-RAN, information regarding cell sites in the O-RAN, the cell sites including a first cell site;

validating, during a build phase of the O-RAN, the information regarding the first cell site, the validated information for the first cell site in the build phase at least partially overlaps with the information validated in the design phase for the first cell site;

validating, during an integration phase of the O-RAN, information regarding a cell site router (CSR) for the first cell site; and validating, during an operational phase of the O-RAN, information regarding at least one network function parameter of the first cell site.

2. The method of claim 1, wherein the first cell site information validated in the design phase comprises at least one of: an identification, a name, a latitude, a longitude, an address, a cell site group, a zip code, a city, a state, a country or a CSR site type of the first cell site.

3. The method of claim 1, wherein information regarding the cell sites include information regarding neighbors of the cell sites, wherein first cell site neighbor information comprises at least one of: an identification, a name, a server site sector identification, a server band identification, or a priority of a neighbor cell site of the first cell site.

4. The method of claim 1, wherein the information regarding the first cell site validated in the build phase of the O-RAN comprises at least one of: an identification, a name, a band, a bandwidth, a carrier bandwidth, a per branch radio power, a prach value, a sector identification, a radio unit identification, or a server site identification of the first cell site.

5. The method of claim 1, wherein the first cell site information validated in the build phase of the O-RAN comprises antenna information regarding an antenna of the first cell site, wherein the antenna information comprises at least one of: an identification, a name, a height, a model number, a mechanical tilt, an electrical tilt, a latitude or a longitude of the antenna.

6. The method of claim 1, wherein the first cell site information validated in the build phase of the O-RAN comprises radio unit (RU) information regarding a radio unit of the first cell site, wherein the RU information comprises at least one of: an identification, a name, a radio identification, or a serial of the radio unit.

7. The method of claim 1, wherein the first cell site information validated in the build phase of the O-RAN comprises information regarding cloud zone of the first cell site, the cloud zone information of the first cell site comprising at least one of: an identification, a name, a vcenter name, a vmc segment, a root, an availability zone, a network segment, or a cluster number of the cloud zone of the first cell site.

8. The method of claim 1, wherein the CSR information for the first cell site comprises at least one of: an identification, a name, or an uplink interface of the CSR in the first cell site.

9. The method of claim 1, wherein the method further comprises validating, during the integration phase, gnodeB (gNb) information for the first cell site, wherein the gNb information for the first cell site comprises at least one of: an identification, a name, a gnodeB identification, or a length of the gNb for the first cell site.

10. A computer system configured to execute a method to facilitate validation of cell sites in different phases of open radio network access (O-RAN), wherein when the method is executed, the computer system is caused to perform:
validating, during a design phase of the O-RAN, information regarding cell sites in the O-RAN, the cell sites including a first cell site;
validating, during a build phase of the O-RAN, the information regarding the first cell site, the validated information for the first cell site in the build phase at least partially overlaps with the information validated in the design phase for the first cell site;
validating, during an integration phase of the O-RAN, information regarding a cell site router (CSR) for the first cell site; and
validating, during an operational phase of the O-RAN, information regarding at least one network function parameter of the first cell site.

11. The computer system of claim 10, wherein the first cell site information validated in the design phase comprises at least one of: an identification, a name, a latitude, a longitude, an address, a cell site group, a zip code, a city, a state, a country or a CSR site type of the first cell site.

12. The computer system of claim 10, wherein information regarding the cell sites includes information regarding neighbors of the cell sites, wherein first cell site neighbor information comprises at least one of: an identification, a name, a server site sector identification, a server band identification, or a priority of a neighbor cell site of the first cell site.

13. The computer system of claim 10, wherein the information regarding the first cell site validated in the build phase of the O-RAN comprises at least one of: an identification, a name, a band, a bandwidth, a carrier bandwidth, a per branch radio power, a prach value, a sector identification, a radio unit identification, or a server site identification of the first cell site.

14. The computer system of claim 10, wherein the first cell site information validated in the build phase of the O-RAN comprises antenna information regarding an antenna of the first cell site, wherein the antenna information comprises at least one of: an identification, a name, a height, a model number, a mechanical tilt, an electrical tilt, a latitude or a longitude of the antenna.

15. The computer system of claim 10, wherein the first cell site information validated in the build phase of the O-RAN comprises radio unit (RU) information regarding a radio unit of the first cell site, wherein the RU information comprises at least one of: an identification, a name, a radio identification, or a serial of the radio unit.

16. The computer system of claim 10, wherein the first cell site information validated in the build phase of the O-RAN comprises information regarding cloud zone of the first cell site, the cloud zone information of the first cell site comprising at least one of: an identification, a name, a vcenter name, a vmc segment, a root, an availability zone, a network segment, or a cluster number of the cloud zone of the first cell site.

17. The computer system of claim 10, wherein the CSR information for the first cell site comprises at least one of: an identification, a name, or an uplink interface of the CSR in the first cell site.

18. The computer system of claim 10, wherein the computer system is caused to perform: validating, during the integration phase, gnodeB (gNb) information for the first cell site, wherein the gNb information for the first cell site comprises at least one of: an identification, a name, a gnodeB identification, or a length of the gNb for the first cell site.

* * * * *